Nov. 4, 1952     H. A. KLASENS ET AL     2,616,817
LUMINESCENT SCREEN
Filed Feb. 14, 1947
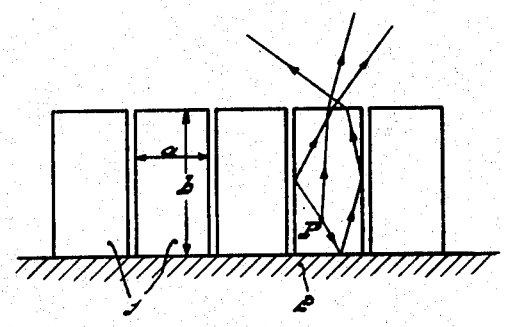
INVENTORS
Hendrik Anne Klasens
Antonius Wilhelmus Vingerhoets
AGENT

UNITED STATES PATENT OFFICE 2,616,817

LUMINESCENT SCREEN

Hendrik Anne Klasens and Antonius Wilhelmus Vingerhoets, Eindhoven, Netherlands, assignors to Hartford National Bank and Trust Company, Hartford, Conn., as trustee Application February 14, 1947, Serial No. 728,560
In the Netherlands January 11, 1944

Section 1, Public Law 690, August 8, 1946
Patent expires January 11, 1964

5 Claims. (Cl. 117—33.5)

This invention relates to a luminescent screen for Braun tubes, X-ray purposes or the like and to a method of making such screens.

The common screens generally comprise as a luminescent material a substance in the crystalline state, which is applied onto a substratum. In Braun tubes and television tubes this substratum often constitutes the bottom of the tube itself. With screens for X-ray purposes the active material is always provided on an opaque substratum.

A luminescent screen according to the invention, for Braun tubes, X-ray purposes or the like, consists of rod-shaped luminescent crystals practically all of which extend parallel with each other and with their largest dimension normally or substantially normally to the surface of the screen.

Consequently, the orientation of the crystals is such that their longitudinal axes are about parallel with the direction in which the rays producing the luminescence strike the screen.

In the screens hitherto known the crystals are arranged at random, which is related with the method of manufacture, according to which for instance the luminescent material is applied onto a substratum from a suspension by deposit or by dusting or by a similar treatment. In general the light rays issuing from the crystals will leave these crystals in all directions. Due to this a considerable spreading of the light always occurs, i. e. in the case of the beam of rays incident on the screen (either X-rays or electrons) having a very small cross section the light patch observed on the screen will be larger than this cross section. In the case of elongated prismatic crystals this spreading also occurs, though the light rays issue for a considerable part at the end faces. If, in effect, light is emitted in the interior of a crystal a part of the rays will be fully reflected at the side walls and will finally leave the crystal at one of the end faces. Consequently, although there is a certain preference direction for the light rays, the spreading will not be reduced, since the crystals are arranged quite unorientated in the screen.

A screen according to the invention possesses the great advantage that all end faces of the elongated prismatic crystals extend parallel or substantially parallel with the substratum and normally to the direction in which the rays fall on the screen and consequently also substantially normally to the direction in which the screen is viewed. Since, as has been stated above, the end faces of the crystals permit the passage of a large part of the total light output, a much greater brilliance is obtained. The screen consists, as it were, of a single crystal, as a result of which the spreading and consequently the absorption are reduced.

The substratum carrying the crystals may be transparent or opaque. In Braun tubes the substratum is generally transparent and in this case an image on the screen will be viewed from the side remote from the source of rays. As an alternative, however, an opaque substratum may be used in a Braun tube, the image having then to be viewed on the side of the source of rays. With screens for X-ray purposes, both for amplification and for screening, the luminescent material is always applied onto an opaque substratum; since this consists of a material readily permitting the passage of X-rays the screen may also in this case be viewed on the side remote from the source of rays. In both cases of using an opaque substratum it is advantageous to make it reflecting, since in this case a greater intensity of the image is obtained. To this end a metal layer may be used as a substratum or may be applied on to the substratum proper in Braun tubes. This yields the additional advantage of obtaining a suitable conduction of the screen, which is very desirable for carrying off the load of the screen. With X-ray screens the reflecting substratum generally consists of glazed paper or cardboard.

One of the most suitable materials for a screen according to the invention is magnesium tungstate, since this crystallizes in the form of very regular elongated prisms.

It has been found that the dimensions of the crystal need not be comprised between very definite limits if only the condition be satisfied that the longitudinal dimension exceeds the largest dimension on the plane normally thereto.

A method for the manufacture of a luminescent screen of the aforesaid kind, which forms also part of the invention, consists in that luminescent rod-shaped crystals are suspended in an electrically insulating medium, wherein they are insoluble. In this medium an electric field is produced, which is directed normally to a substratum also contained in the medium. As a result of the electric field all crystals become orientated parallel with each other in such a manner that their largest dimension coincides with the direction of the electric field. When the crystals deposit on the substratum they will form a luminescent screen thereon, in which all crystals extend parallel with each other and normally to the surface of the substratum.

A method according to the invention will preferably be carried out in such a manner that the field is directed parallel with the direction in which the crystals settle under the action of gravity. In this case the substratum will be placed horizontally in the liquid.

As a suspension medium, substances such as benzene or toluol may be used.

Hereinafter an example is given how the method according to the invention is carried out.

Crystals of magnesium tungstate (long thin prisms) are brought into benzene between two horizontal metal plates at a distance of 3 mms. from each other, between which a voltage of about 1500 v. is set up. All crystals deposit normally to the bottom electrode, which is positive. Consequently, this electrode might be used as a luminescent screen, for instance in a Braun tube. Of course, it is not necessary for the crystals to settle directly on the electrode, since, for instance, an insulating layer may be provided on the electrode, so that they deposit on this layer.

After the manufacture this substratum with the crystals available thereon is removed and used as a luminescent screen.

By a suitable positioning one or both electrodes may also be located outside the liquid. This is important, for instance, when the bottom of a Braun tube is to be coated with a luminescent layer.

In order that the invention may be clearly understood and readily carried into effect it will now be described more fully with respect to the accompanying drawing, in which a luminescent screen according to the invention is represented by way of example.

In the drawing the crystals are designated 1 and extend all parallel with each other and normally to the substratum 2. In this example the substratum has a reflecting surface. The size $a$ of each crystal substantially is comprised between 0.01 and 0.1 mm., the size $b$ being about 0.3 mm. Thus length $a$ indicates a minor axis and length $b$ a major axis of the crystal.

When light is produced at a point P of a crystal the light rays will follow inter alia the paths as indicated by full lines and arrows. Since use is made of a reflecting substratum, also the rays emitted in the direction thereof will be reflected again in such a manner as to leave the crystal finally at the other end.

The crystals may be made to adhere to the substratum in various ways. As an adhesive use will preferably be made of cellulose esters or -ethers such as nitro-cellulose or ethyl-cellulose. In fact, these substances can be dissolved in the suspension medium. After deposit of the luminescent material on the substratum the suspension medium is vaporized, if desired by heating, the adhesive remaining between the crystals and the substratum and between the crystals.

What we claim is:

1. A luminescent screen comprising a substratum, and a layer of luminescent material consisting essentially of rod-shaped crystals having major and minor axes, said crystals being positioned on said substratum with their major axes substantially perpendicular to the said substratum.

2. A luminescent screen comprising a transparent substratum, and a layer of luminescent material consisting essentially of rod-shaped crystals having major and minor axes, said crystals being positioned on said transparent substratum with their said major axes substantially perpendicular to the said transparent substratum.

3. A luminescent screen comprising an opaque reflecting substratum, and a layer of luminescent material consisting essentially of rod-shaped crystals having major and minor axes, said crystals being positioned on said opaque reflecting substratum with their said major axes substantially perpendicular to the said opaque reflecting substratum.

4. A luminescent screen comprising a substratum, and a layer of magnesium tungstate material consisting essentially of rod-shaped crystals having major and minor axes, said crystals being positioned on said substratum with their said major axes substantially perpendicular to the said substratum.

5. A luminescent screen consisting of crystals of magnesium tungstate in the form of regular, elongated prisms about 0.3 mm. long and from about 0.01 to about 0.1 mm. in cross section, in which practically all of said crystals are oriented with their largest dimension substantially perpendicular to the surface of a substratum, to which said crystals are attached by means of a binder.

HENDRIK ANNE KLASENS.
ANTONIUS WILHELMUS VINGERHOETS.

REFERENCES CITED

The following references are of record in the file of this patent:

UNITED STATES PATENTS

| Number | Name | Date |
| --- | --- | --- |
| 1,718,626 | Bleecker | June 25, 1929 |
| 1,954,691 | De Boer et al. | Apr. 10, 1934 |
| 2,027,087 | Buckner | Jan. 7, 1936 |
| 2,062,858 | Batchelor | Dec. 1, 1936 |
| 2,137,118 | Schleede | Nov. 15, 1938 |
| 2,177,701 | Fonda | Oct. 31, 1939 |
| 2,184,348 | Kirchner et al. | Dec. 26, 1939 |
| 2,220,860 | Blodgett | Nov. 5, 1940 |
| 2,224,324 | Van Steenis | Dec. 10, 1940 |
| 2,240,706 | Law | May 6, 1941 |
| 2,245,843 | Wesch | June 17, 1941 |
| 2,418,479 | Pratt et al. | Apr. 8, 1947 |
| 2,426,016 | Gustin et al. | Aug. 19, 1947 |